Oct. 10, 1933.  M. W. McCONKEY  1,930,105
BRAKE OPERATING MECHANISM
Filed Jan. 25, 1928
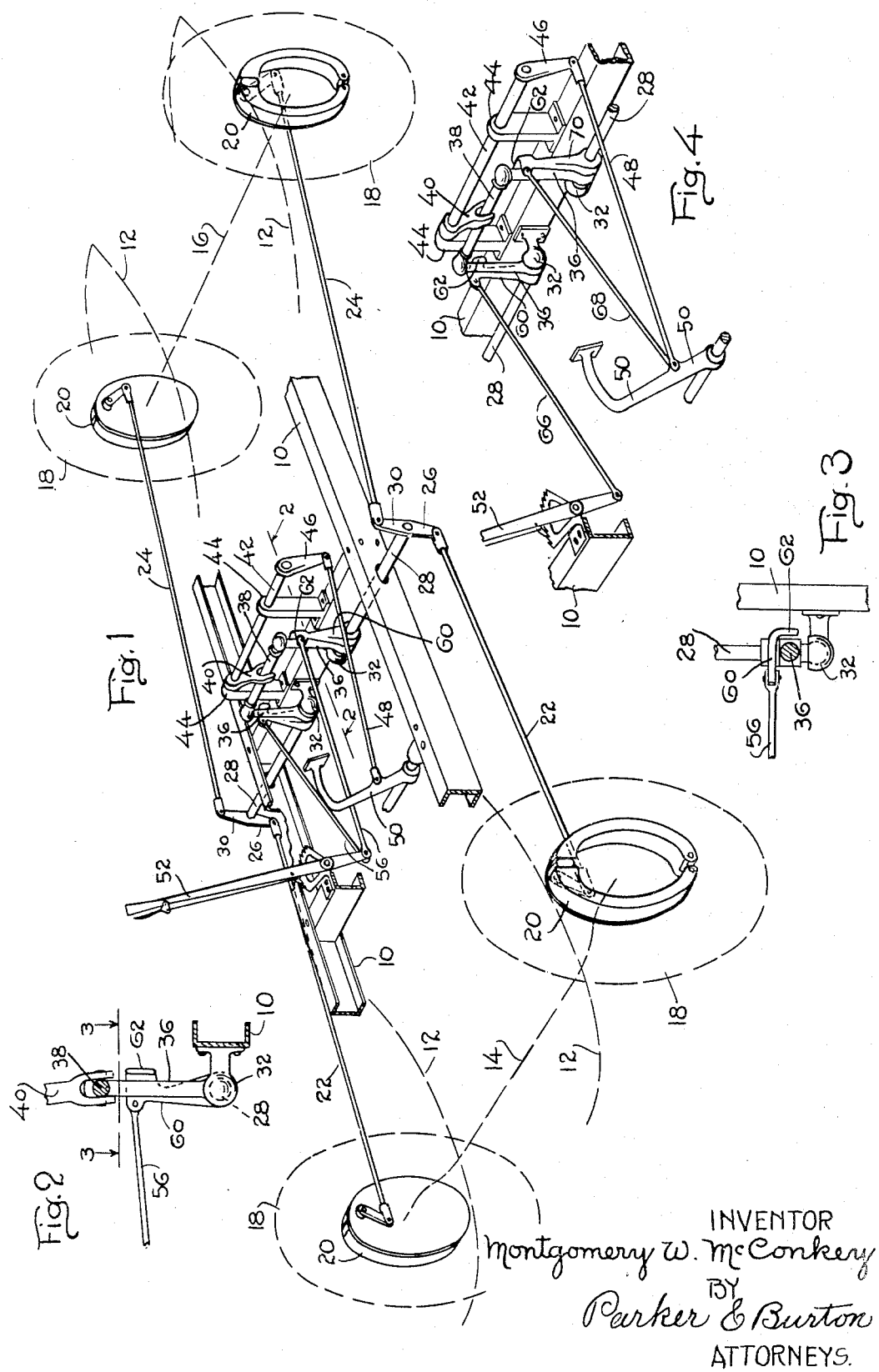
INVENTOR
Montgomery W. McConkey
BY
Parker & Burton
ATTORNEYS.

Patented Oct. 10, 1933

1,930,105

UNITED STATES PATENT OFFICE 1,930,105

BRAKE OPERATING MECHANISM

Montgomery W. McConkey, South Bend, Ind., assignor to Bendix Brake Company, Chicago, Ill., a corporation of Illinois Application January 25, 1928. Serial No. 249,294

5 Claims. (Cl. 188—204)

This invention relates to brakes and it is illustrated as embodied in novel operating mechanism for a system of four wheel automobile brakes.

An object of the invention is to arrange the parts in a simple and inexpensive manner so that they may be operated by the foot pedal or its equivalent through equalized connections and by the hand lever or its equivalent by unequalized connections. Another object of the invention is to arrange the parts so that failure of the left brakes will not interfere with the operation of the right brakes and vice versa.

Having these objects in view, the mechanism may include a pair of shafts arranged end to end crosswise of the vehicle and universally mounted at their inner ends so that their outer ends may shift to equalize between the front and rear brake operated by that shaft.

These shafts are both operated through an equalizer bar or its equivalent by means such as the usual service brake pedal; the emergency hand lever, or other auxiliary operating member, is preferably connected by suitable one-way connections in such a manner as to operate both of the above described shafts without equalization so that in case the one shaft fails or is rendered ineffective by the failure of some other part, there is no interference with the operation of the remaining shaft.

In an alternative arrangement the hand lever is arranged to operate one of the above described shafts by a direct tension connection while the foot pedal not only operates the equalizer but also has a safety connection to the other shaft which becomes effective in case of a failure of the equalized connections.

The above objects and features of the invention will be apparent from the following description of the illustrative embodiments shown in the accompanying drawing in which:

Fig. 1 is a diagrammatic perspective view of an automobile chassis showing one embodiment of the invention in the brake operating mechanism;

Fig. 2 is a partial section on the line 2—2 of Fig. 1 showing one of the one-way connections;

Fig. 3 is a section on the line 3—3 of Fig. 2 showing the details of the one-way connection;

Fig. 4 is a partial diagrammatic perspective view corresponding to a part of Figure 1 but showing an alternative construction in the arrangement of Figs. 1 to 3.

The automobile chassis includes the usual frame 10 supported by springs 12 on a front axle 14 and the rear axle 16. The front and rear axles in turn are supported by road wheels 18 each of which is provided with a suitable brake 20, the front brakes being operated by rods or cables or other tension connections 22 while the rear brakes are operated by similar connections 24.

The connections 22 from the front brakes are connected at their rear ends to arms 26 on the outer ends of two shafts 28, while the connections from the rear brakes are connected to similar but oppositely extending arms 30 on the shafts 28. The shafts 28 are supported at their outer ends to permit them to shift a short distance endwise of the vehicle to equalize the pressure between the front and rear brakes. The inner end of each shaft 28 is universally mounted to permit the above described shifting without interfering with the turning of the shaft, for example by being formed with an integral ball 32 received in a corresponding socket mounted on a cross member of the vehicle frame 10.

Adjacent to the inner end of each of the shafts 28 is an upwardly extending arm or operating lever 36. The two levers 36 are connected by means such as an equalizer bar 38 received in a fork 40 extending downwardly from an operating shaft 42 journaled in bearings 44 mounted on the vehicle frame and operated by an arm 46 connected by a rod or cable or other tension element 48 with the usual foot pedal 50 or its equivalent. The above described arrangement permits the operation of all four of the brakes by depression of the foot brake pedal with full equalization as among the four brakes.

The hand lever 52 is preferably connected by two rods or cables or similar tension elements 56 directly to one-way connections for operating the shafts 28. In the illustrative arrangement each tension element 56 is connected to a lever 60 loosely mounted on one of the shafts 28 and having an operating lug 62 extending behind the corresponding operating lever which is fixedly mounted on the shaft.

It will be seen that the operation of the hand lever operates through the tension connections 56 to operate both the right system of brakes and the left system of brakes and that the complete failure of one of these systems of brakes in no way interferes with the operation of the other system and of the hand lever.

The arrangement shown in Fig. 4 is similar to the one described above except that the hand lever is connected by a tension element 66, corresponding to the connection 56, to the right hand shaft 28 only while the pedal has an additional safety connection 68 to a one-way operating lever 70 loosely mounted on the left hand shaft and arranged to operate the shaft after a short lost motion in case of a failure in the equalized operating connections.

While two illustrative embodiments of the invention have been described in detail, it is not my intention to limit its scope to those particular embodiments or otherwise than by the terms of the appended claims.

I claim:

1. In combination with a motor vehicle, a pair of actuating shafts rotatably journalled at their inner ends and semi-floating at their outer extremities, a brake shaft actuating arm secured to the inner end of each of said shafts, a brake operating member, a connection between said brake operating member and said brake actuating shafts, said connection including means for equalizing the brakes actuated by each of said shafts, and a second independently operable member disconnectedly coupled to each of said arms for independent actuation of said shafts.

2. In combination with a motor vehicle, a pair of brake actuating shafts rotatably journalled at their inner ends and semi-floating at their outer extremities, an arm secured to the inner end of each of said shafts, an equalizer bar connecting each of said arms, a second shaft rotatably journalled adjacent said equalizer bar and coupled therewith, a brake operating member coupled with said second shaft, and a second brake operating member disconnectedly coupled with each of said brake actuating shaft arms.

3. In combination with a motor vehicle, a pair of brake actuating shafts mounted for universal movement at their inner extremities, an arm secured to the inner extremities of each of said shafts, an equalizer bar connecting said arms, a brake pedal, a shaft rotatably journalled adjacent said equalizer bar and coupled therewith, an arm on said shaft, a rigid link connecting said arm and said brake pedal whereby a positive application and release of said brakes is procured, a second manually operable brake operating member disconnectedly coupled with each of said brake actuating shaft arms and operable to apply the brakes independently of said brake pedal.

4. In combination with a motor vehicle, a pair of brake actuating shafts rotatably journalled at their inner ends and supported for horizontal movement at their outer ends, an arm secured to the inner end of each of said shafts, an equalizer bar connecting said arms, a rod rotatably journalled adjacent said equalizer bar, an arm secured to said rod and having a bifurcated extremity engaging said equalizer bar, a second arm secured to said rod, a brake pedal, and a connection between said last mentioned arm and said pedal.

5. An automotive vehicle having a chassis, front and rear wheels supporting said chassis, a foot pedal, a hand actuating member, a pair of levers both mounted for pivotal movement about a substantially horizontal laterally extending axis and positioned respectively adjacent to opposite sides of said chassis, a connection from said hand actuating member to one said lever, a connection from the foot pedal to the other said lever, a connection from one end of one lever to a front brake, a connection from the other end of said lever to a rear brake, a connection from one end of the other said lever to the other front brake, a connection from the other end of the last named lever to the other rear brake, and means for connecting said levers to each other.

MONTGOMERY W. McCONKEY.